United States Patent [19]

Yasunaga

[11] 4,053,734
[45] Oct. 11, 1977

[54] CURVE READING METHOD AND APPARATUS

[76] Inventor: Soichiro Yasunaga, 2-28, Denenchofu, Ohta, Tokyo, Japan

[21] Appl. No.: 698,760

[22] Filed: June 22, 1976

[30] Foreign Application Priority Data

June 23, 1975 Japan .................................. 50-75686
Oct. 3, 1975 Japan .................................. 50-118798

[51] Int. Cl.$^2$ ...................... G06K 11/02; B22D 7/10; G11B 5/09
[52] U.S. Cl. ............................. 235/61.6 A; 250/202; 340/146.3 AC; 360/32
[58] Field of Search ...................... 235/61.6 A, 61.6 B, 235/61.6 R, 150.5, 150.53, 183; 250/202; 240/146.3 AC, 146.3 AE, 347 P; 360/32

[56] References Cited

U.S. PATENT DOCUMENTS

| | | | |
|---|---|---|---|
| 3,303,491 | 2/1967 | Silverman | 235/61.6 A |
| 3,511,979 | 5/1970 | Robe et al. | 235/61.6 R |
| 3,535,495 | 10/1970 | Caylor | 235/61.6 R |
| 3,644,714 | 2/1972 | Phillips et al. | 235/61.6 A |

*Primary Examiner*—Daryl W. Cook
*Attorney, Agent, or Firm*—William J. Daniel

[57] ABSTRACT

Method and apparatus for reading a curve line present on a recording medium and providing a digital or analog output indicative of the path of such curve line, wherein an optically visible curve line present on a recording material is caused to move relatively to an electronic camera tube; the electronic camera tube photoelectronically scans an optical image with a narrow scanning beam moving across the medium along a locus extending transversely of the recording direction and generates a video output signal containing for each scanning period a voltage train varying in accordance with the optical intensity of the segment of the medium being scanned and which contains at least one pulse produced when the scanning beam crosses the curve line image; the voltage train for each such scanning period is inverted in polarity and combined additively with the voltage train produced during a prior scanning period to give when the variations in such two signal trains are out of synchronism an output signal having a magnitude according to the magnitude of the individual pulses and the extent of their nonsynchronization; the thus generated output signal is compared with a reference signal of fixed magnitude to detect when the same exceeds the reference signal magnitude and in that event to deliver an output pulse; and the output pulse actuates a digital counter driven in synchronism with the scanning rate of the tube scanning beam to read out the instantaneous count in said counter. The voltage train of the prior scanning period can be stored in a memory device controlled by the output pulse so that the memory device repeats a given signal train until signaled by such pulse to erase that chain and store the next train therein.

8 Claims, 3 Drawing Figures

CURVE READING METHOD AND APPARATUS

INTRODUCTION

This invention relates to an improved reader for curve lines plotted or inscribed on graphs, charts and the like and is concerned more particularly with a curve line reader which provides an accurate indication of the path of the curve with minimum distortion due to extraneous noise or background variations.

BACKGROUND OF THE INVENTION

In modern technology, it is frequently necessary or desirable to monitor various operating conditions for industrial processes and to retain a record of this information which can be analyzed or compared if the need should arise. For this purpose, various recording devices adapted to inscribe a visible curve on a record medium, such as an elongated strip chart, a circular chart or the like, driven at a given rate of speed so that variations in the monitored condition as a function of time are recorded in visible form have been developed.

With increasing emphasis being placed on the operation of industrial processes by remote control with a maximum of automation, it has become necessary to transmit the operating parameters for the given processes to remote locations, and curve scanning and transmitting systems, which will be referred to here as a "curve line reader", have been developed for this purpose. Such a system typically utilizes a television camera tube on the face of which is projected an optical image of a given portion of the recording medium to be read, and this optical image is repeatedly scanned by the electron beam of the camera tube at the usual high scanning rate along a substantially linear locus, extending at right angles to the length of the medium to be scanned. Since the optical density of the visible curve line differs from the background density of the medium, a pulse will be created in the video signal each time the beam crosses the curve line. Thus, the video signal gives an electronic representation of the location of each precise segment of the curve scanned by the electronic beam and from these signals, the original curve can be recreated at a remote point or fed either as analog or digital values to an electronic computer serving to process the data as may be desired.

Since the thickness of the curve line being detected by the scanning system is quite small, and may be of low density or contrast compared to the background, the precise detection of the curve line by the scanning system becomes difficult especially for differentiation from the "noise" present in the system. This "noise" may occur in the electronic components constituting the system or it may take the form of accidental smudges or spots on the background of the record material itself which are likewise capable of being picked up by the scanning system.

The object of the present invention is to provide a curve reader system which is relatively free from the influence of extraneous noise and provides a positive precise indication of the position of the curve line being scanned.

SUMMARY OF THE INVENTION

According to the invention, an optically visible curve line present on a recording material is caused to move relatively to an electronic camera tube; the electronic camera tube photoelectronically scans an optical image of the material with a narrow scanning beam moving across the medium of a fixed scanning frequency along a locus extending transversely of the recording direction and generates a video output signal containing for each scanning period a voltage train varying in accordance with the optical density of the segment of the medium being scanned and which contains a pulse produced when the scanning beam crosses the curve line; the voltage train for each such scanning period is inverted in polarity and compared by an additive combination with a voltage train produced during a prior scanning period to give when the variations in such two signal trains are out of synchronism an output signal having a magnitude according to the magnitude of the individual pulses and the extent of their non-synchronization; the thus generated output signal is compared with a reference signal of fixed magnitude to detect when the same exceeds the reference signal magnitude and in that event to deliver an output pulse; and the output pulse actuates a digital counter driven in synchronism with the scanning rate of the tube scanning beam to read out the instantaneous count in said counter. The instantaneous count of the counter thus measures the elapsed time between the beginning of a scanning period which time corresponds to the distance or location of the curve segment above a base line.

The voltage train of the prior scanning period can be stored in a memory device controlled by the output pulse so that the memory device repeats a given signal train until signaled by such pulse to erase that chain and store the next train therein. The memory device can store a given signal train in digital form supplied to it by an analog-digital converter receiving the video output signal from the video tube, the output from the memory device being reconverted to analog form for the additive combination with the current voltage train.

The memory device can, alternatively, or by way of an additional memory device, store the voltage train for the immediately preceding scanning period for comparison with the current voltage train to facilitate the detection of rapidly swinging changes in the curvature of the curve line.

BRIEF DESCRIPTION OF THE DRAWINGS

The above object and advantages will be more completely disclosed by the following detailed description when read in conjunction with the accompanying drawings, in which.

DETAILED DESCRIPTION OF THE INVENTION

Figure 1:
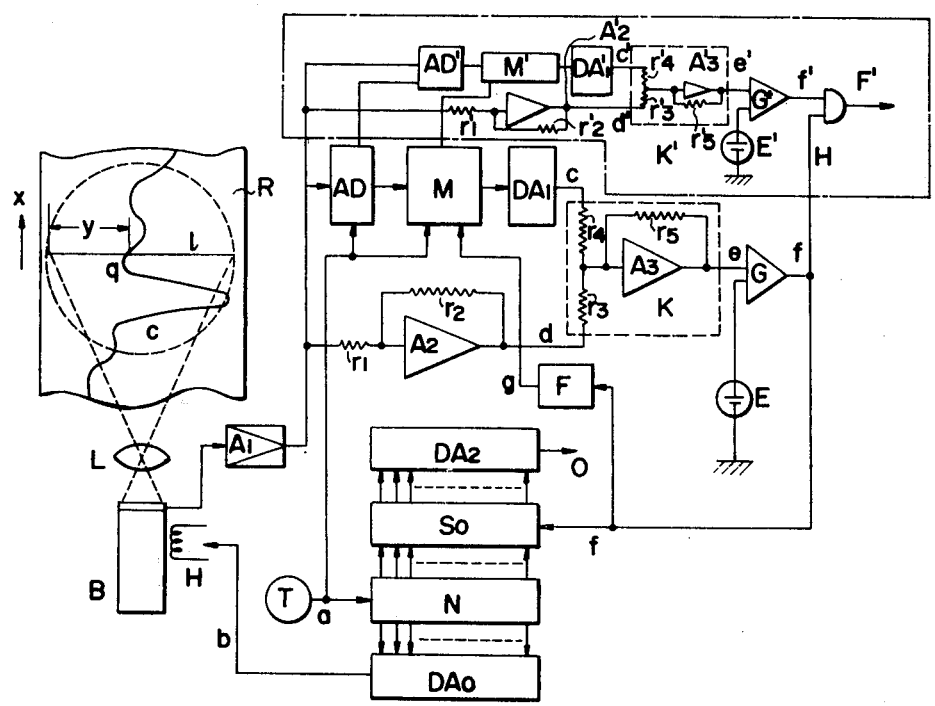
FIG. 1 is a schematic diagram of the apparatus of the invention including within a dot-dash area a modification.

As shown in the diagram of a representative embodiment of the invention depicted in FIG. 1, a recording medium in the form of an elongated strip chart R bearing a linear curve C inscribed thereon in some visible form is advanced in the direction of its length indicated by the arrow $x$ at a constant predetermined speed by means not shown. At a fixed location along the path of the recording paper R is a television camera or video tube B which is preferably a vidicon type tube. As is known, and hence not shown in the drawings, vidicon tube B includes a photoelectric signal plate which receives an optically projected image of a certain area of the recording medium via a conventional arrangement of optical lense represented at L. The field of vision of the camera tube and lense should cover the entire transverse dimension of the recording medium, or at least that portion occupied by the curve line, as indicated by the area within the dotted circle C, to ensure coverage of the entire range of meandering of the curve line. Within the camera tube B, a narrow electronic beam is moved in a transverse direction by means of the horizontal deflection coil H of the tube. Where relative movement between the recording medium and tube is achieved by advancing the medium itself, as is preferred, the movement of the scanning beam is along a fixed transverse locus indicated by the chain line 1 seen in FIG. 1.

The horizontal deflection coil H of the video camera tube B is operated at a fixed frequency and thus makes one complete transverse sweep of the scanning locus 1 within a fixed period of time, which will be referred to as the scanning period, such operation being by means of a binary digital counter array N having a plurality of counting stages which is driven by a clock pulse generator T through the medium of a digitalanalog converter $DA_0$. The clock pulse output $a$ of generator T is shown by waveform $a$ in FIG. 2. The output $b$ of converter $DA_0$ has a ramp or sawtooth shape illustrated schematically in waveform $b$ (FIG. 2) with each tooth having a length equal to one scanning period $t_s$ and being spaced or separated from the next successive tooth to indicate the return of the scanning beam of camera tube B to starting position to begin the next scanning period. The scanning beam begins at the location along one side of the recording chart R to give a "base line" common to all measurements of the relative positions of the curve line C.

The output of the digital counter N is delivered to a second digital-analog converter $DA_2$ through a switching device $S_0$ so as to deliver when the switching device is activated, as will be eventually described, an analog output O from converter $DA_2$ corresponding to the digital count in the counter at the instant switching device $S_0$ is activated. Of course, if a digital output is preferred, converter $DA_2$ can be omitted.

The video signal from camera tube B is amplified by an amplifier $A_1$ and after being converted to digital form by analog-digital converter AD, is delivered to a memory device M to be stored therein. Memory device M and converter AD are operated under the control of clock pulse generator T so that the output voltage signal from the camera tube is sampled in synchronism with the elapsed count of the counter N. Thus, memory M has fed thereto a series of digital values corresponding to the amplified voltage output of vidicon tube B which includes successive sets of values for successive scanning periods. However, these values are not read into the memory until it is actuated to receive them and once memory device M has been actuated to receive a set of digital values corresponding to one scanning period of the camera tube, it operates to retain that set of values and repeatedly feed out the same stored set of values to a digital-analog converter $DA_1$ for reconversion into an analog output $c$.

The video output signal from camera tube as amplified by amplifier $A_1$ is also delivered to an operational amplifier of the feedback type constituted by input resistance $R_1$, an amplifier circuit $A_2$ and a feedback resistance $R_1$, giving an output $d$ equal in magnitude but reversed in polarity to the amplified video signal input.

Figure 2:
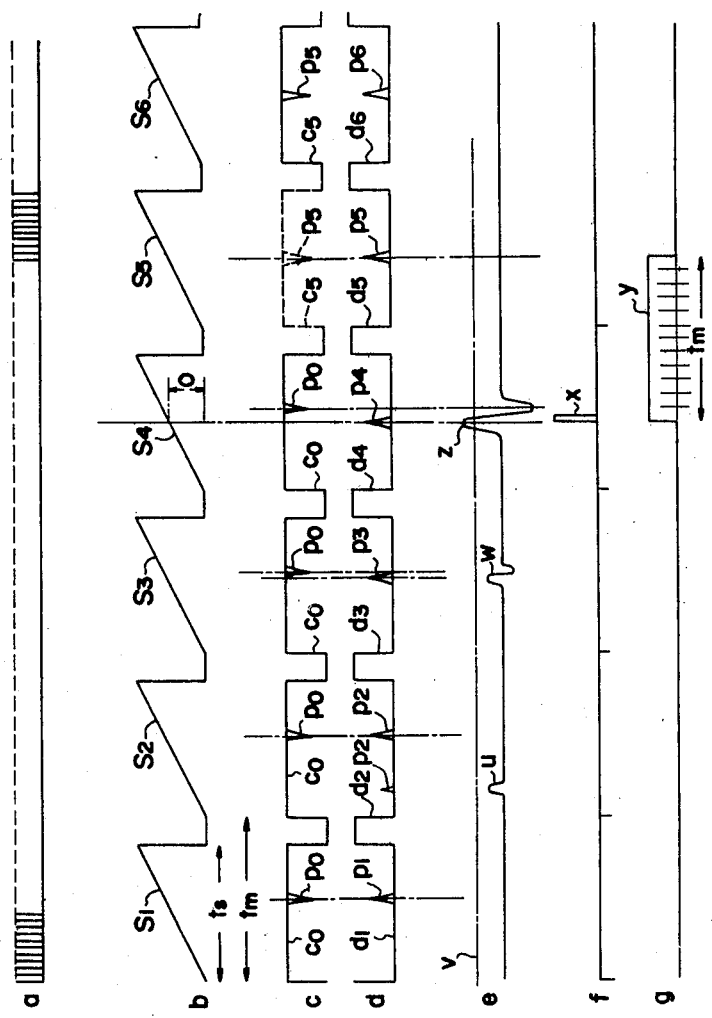
FIG. 2 is a waveform diagram illustrating the waveforms produced at several different points in the schematic arrangement of FIG. 1, exclusive of the modification, in time registering relation.

Waveforms representing the variation in the video output signal are illustrated at $c$ and $d$ in FIG. 2. Waveform $c$ corresponds to the output signal of amplifier $A_2$ and thus represents the actual or instantaneous output from the tube for each current scanning period while waveform $d$ represents the output values (in analog form) for the scanning period stored in the memory device. The general shape of waveforms $c$ and $d$ shown in the drawings has been idealized for sake of clarity to square wave form and may not correspond to the actual shape of a vidicon tube output since any different is immaterial for purposes of this invention. Each square wave of waveform $c$ and $d$ represents one scanning period $t_s$.

The outputs $c$ and $d$ are delivered to the two inputs of an adder K constituted by the input resistances $r_3$ and $r_4$, one for each input, an amplifier circuit $A_3$ and a feedback resistance $r_5$. Since signals $c$ and $d$ are of mutually opposite polarity, they offset one another so long as they are in synchronism and no output is delivered by the adder K. When the input signals $c$ and $d$ are out of synchronism, however, adder K delivers an output $e$ to a comparator G which compares the magnitude of signal E with a reference voltage level $v$ from a d.c. reference voltage source E which in effect serves as a "filter", delivering no output $f$ until its input $e$ exceeds the "threshold" of the reference voltage level.

When an output pulse $f$ does appear, it is delivered to a pulse shaping circuit F which elongates the instantaneous output pulse from comparator G for a duration equal to one full scanning period $t_s$, (i.e. each sawtooth in the waveform $b$) plus the time separation between each of the scan periods. The shaped pulse from circuit F is depicted in waveform $g$ and serves to control the functioning of memory device M. So long as waveform G is "low" at the beginning of a scanning period, memory device M retains the previously stored set of values from a prior scanning period and continues to deliver the previously stored set in analog form to one input of adder K. However, the presence of a "high" in waveform G at the beginning of any subsequent scanning period constitutes a "write in" signal to the memory device to receive the new set of values developed during the next scanning period and to store the new set therein for subsequent readout as well as to transmit the new set to adder K.

Output pulse $f$ also serves to actuate switching device $s_0$ which thereupon transmits the instantaneous count present at that time in the binary counter N to the converter $DA_2$ so as to provide an analog output O corresponding to the instantaneous count in counter N. Since the scanning sweep of video camera B is synchronized with the set of values stored in the memory device M as well as with the counting action of counter N, the instantaneous count in counter N at the instant pulse $f$ reaches switch $S_0$ represents the elapsed time between the start of a given scanning period and the generation of pulse $f$. The production of pulse $f$ occurs due to the change in the video signal incidental to impingement of the scanning beam with curve line C; consequently, the instantaneous count in the counter gives a precise measurement of the location or position of the point of the curve line at locus 1 relative to the "base line" at the beginning of the scanning periods.

In FIG. 2 there is shown a series of scanning periods $s_1$, $s_2$, $s_3$ etc. (waveform $b$) with the corresponding output segments in waveforms $c$ and $d$ as delivered to the adder K for comparison by additive combination. It is assumed that during scanning period $s_1$ D/A converter DA transmits from memory device M an output segment $c_o$ stored therein during a prior scanning period (not shown) while amplifier $A_2$ delivers an output segment $d_1$ of inverted polarity and that the pulses $p_0$ and $p_1$ (attributable to curve line C) in segments $c_0$ and $d_1$ are in timed registration. Therefore, output $c$ from adder K shows no signal.

In scanning period $s_2$, segment $c_0$ is repeated by the memory device with $p_0$ unchanged while segment $d_2$ contains peak $p_2$ (generated by curve line C) in unchanged position and in addition an accidental or "extraneous" peak $p_u$ attributable to electronic noise or a "flyspeck". Since the stored output segment $c_0$ contains no extraneous peak $p_e$, an output signal $u$ appears in waveform C. The magnitude of signal $u$ is below the reference voltage level $v$, however, and consequently there is no output pulse in wave $f$ and no change in the system.

In scanning period $s_3$, the position of curve line C is assumed to begin to shift toward the base line and peak $p_3$ in output signal $d_3$ appears slightly in advance of peak $p_0$ which remains unchanged in the again repeated stored segment $c_0$ and while a signal appears in waveform $e$ at $w$, its magnitude is below reference voltage $v$ and the system remains unchanged with no pulse in waveform $f$.

During scanning period $s_4$ the curve line point has become displaced a significant distance away from its prior location and peak $p_4$ in output segment $d_4$ is well out of synchronism from $p_0$ in stored segment $c_0$ and a strong signal $z$ appears in waveform $e$ exceeding reference voltage $v$. This causes the appearance of a pulse $x$ in waveform $f$ and the output $g$ from pulse shaping circuit F goes high as at $y$ for a fixed time equal to the time period $t_m$ from the start of one scanning period to the start of the next successive scanning period. Thus, waveform $g$ will remain high at least until the starting of the next following scanning period, irrespective of changes in the position of the curve line point at the scanning locus, and the memory will be signaled to erase the previous stored output segment, i.e. $c_0$ in this case, and receive and store a new set of values corresponding to the next scanning period $s_5$. The new stored output segment is indicated in dotted line at $c_5$ corresponding to segment $d_5$ with peak $p_5$.

In the meantime, pulse $x$ in waveform $f$ has also served to actuate switching device $S_0$ to provide an analog readout O which has a magnitude equal to $o$ indicated in period $s_4$ of waveform $b$ in FIG. 2 and thus gives an indication of the position of the curve line point at the scanning locus.

In the following scanning period $s_6$, it is assumed that no change in the curve line occurs and fresh stored segment $c_5$ is read out of the memory while a new segment $d_6$ appears in waveform $d$. Peaks $p_5$ and $p_6$ are in synchronism in segments $c_5$ and $d_6$ and the system undergoes no change.

A modification of the previously described system contains the additional components enclosed within the dash-dot line at the top of the schematic view of FIG. 1, and makes it possible to monitor the curve line portion on a pre-set basis of comparison as well as a result of actual changes in the curve line itself. In the modified arrangement, the video output signal is transmitted, in addition to the manipulation effected upon it in the main system, to an operational amplifier $A_2$ of the feedback type and having an output $d'$, as well as to an A/D converter AD' and a memory device M' giving after reconversion in D/A converter DA', an output $c'$. Converter AD' and memory M' sample the video signal under the control of pulse generator T as before. Memory device M' acts to delay for one scanning period the output signal actually delivered by tube B during a given scanning period which is to say that the memory device reads out through converter DA' as output $c'$ the output segment corresponding to the preceding scanning period while amplifier $A'_2$ reads out the values for the actually occurring scanning period. These outputs $c'$ and $d'$ are fed to an adder K' constituted by the opposite input resistance $r'_3$ and $r'_4$ and an amplifier circuit $A'_3$, giving an output $e'$ which therefore represents the sum of the inputs $c'$, $d'$. Output $e'$ is delivered to a comparator G' for comparison against a threshold voltage $v'$ from d.c. source E' and when its magnitude exceeds this threshold level, comparator G' emits an output pulse $f$ for delivery to an OR gate H. OR gate H also receives the instantaneous pulse $f$ from comparator G of the main system and is effective to emit a pulse F' when either or both of input pulses $f$ and $f'$ are received by it.

The modification, therefore, in effect compares the video signal segment for each actual scanning period with the segment of the immediately preceding set of values to emit an output pulse when a discrepancy in this comparison takes place. The timing of the thus emitted output pulse is in turn OR-gated with the output pulse from the main comparator G, so that if either of these two pulses occurs an indication is provided in the form of a pulse in output F' which pulse can be delivered to the switching device $S_0$ to actuate the readout at O of the instantaneous count on counter N at that instant.

Figure 3:
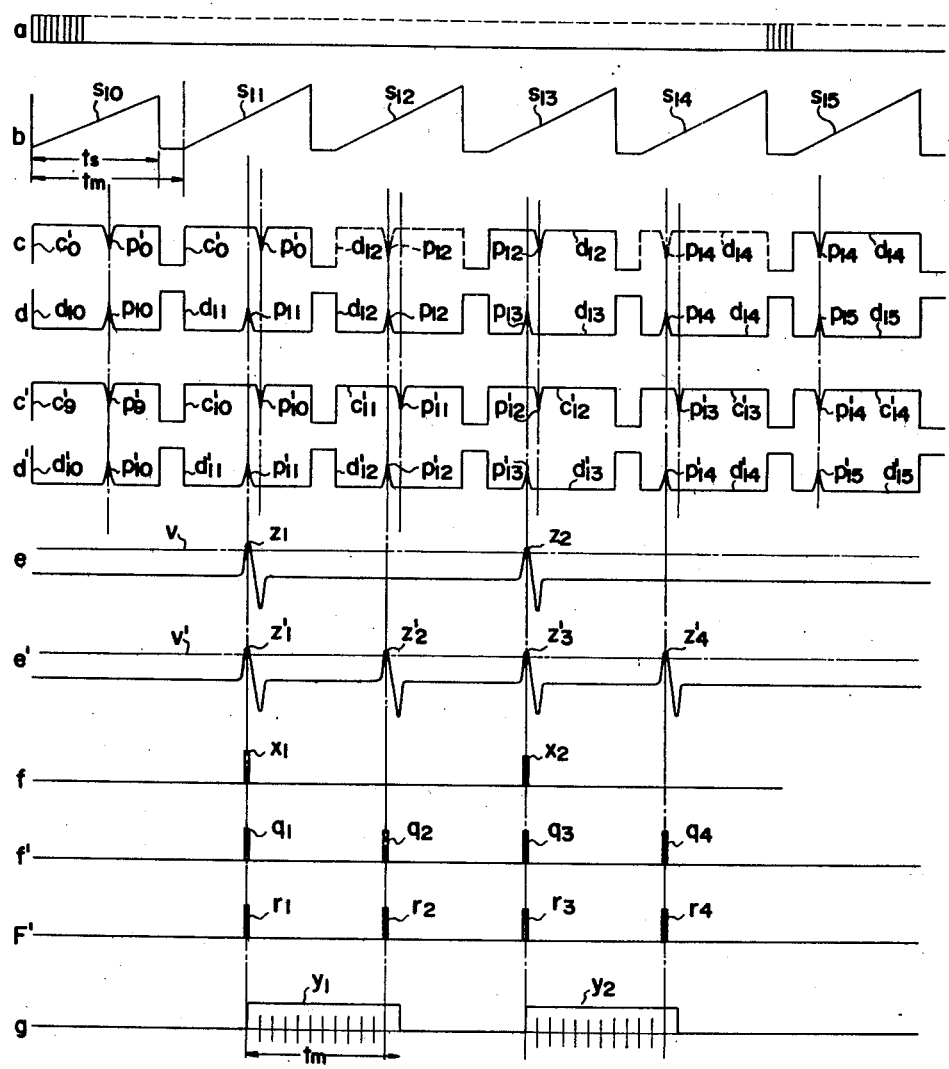
FIG. 3 is an illustration similar to FIG. 2 of the various waveforms produced in the apparatus of the invention including the modification, again in time registering relation.

The operation of the modified system is illustrated in FIG. 3 where a series of scanning periods $s_{10}$, $s_{15}$ appear. In scanning period $s_{10}$, the main memory device M has stored therein from some prior scanning period the video output segment $c'_o$ which has a peak $p'_0$ therein (not shown). The actually occurring video signal segment $d_{10}$ is assumed to have its peak $p_{10}$ in synchronism with the peak $p'_0$ of the prior stored segment so that no output appears at $e$ from the adder K.

Also during scanning period 10, the secondary amplifier $A'_2$ delivers to the second adder K' the current output segment $d'_{10}$ which, of course, is identical to segment $d_{10}$ with its peak $p'_{10}$. The secondary memory device M' has stored therein the output segment $c'_9$ for the immediately preceding scanning period (not shown) and it is assumed that the peak $p'_9$ for the prior scanning period is in synchronism with peak $p'_{10}$. Consequently, no output appears at $f$.

Thus, during scanning period $s_{10}$, no change occurs in the system.

Beginning with scanning period 11, it is assumed that a sharp or sudden deviation in the path of the curve line C on record material is taking place and thus the actual occurring segment $d_{11}$ has a peak $p_{11}$ therein which is definitely out of synchronism with the peak $p'_0$ that is repeated by the memory device during scanning period $s_{11}$. Consequently, a sharp output pulse occurs at $z_1$ in waveform $e$ of FIG. 3.

Supplementary memory device M' repeats the prior output segment $c'_{10}$ during scanning period $s_{11}$ and, since the peak $p'_{10}$ for the prior scanning period is also out of synchronism with the peak $p'_{11}$ in the actually occurring segment $d'_{11}$, a sharp output pulse likewise appears at $z'_1$ in waveform $e'$.

Since the outputs $z_1$ and $z'_1$ both exceed the fixed reference voltage levels $v$ and $v'$, pulses appear in waveform $f$ at $x_1$ and waveform $f$ at $q_1$ and the gate H delivers a pulse $r_1$ in waveform $f$. Waveform $g$ thus becomes high, as at $y_1$, and the main memory device M is actuated to erase the prior stored output segment $c'_0$ and read in the following output segment and an output $o$ appears from converter $DA_2$ showing the instantaneous count of counter N.

In scanning period $s_{12}$, the output segment $d_{12}$ occurring therein is read into the main memory device M, as indicated in dotted lines in waveform $c$, while the same output $d_{12}$ with the peak $p_{12}$ is being transmitted by the amplifier $A_2$. No output therefore appears at $e$.

The supplementary memory device M' during scanning period $s_{12}$ transmits the stored segment $c'_{11}$ with its peak $p'_{11}$ which is out of synchronism with the peak $p'_{12}$ in the current output segment $d'_{12}$ and hence a sharp output appears in waveform $e'$ at $z'_2$ which leads to the generation of an output $q_2$ in waveform $f$. Consequently, gate H develops a pulse $r_1$ as appears in waveform $f$.

During scanning period $s_{13}$, the curve line continues to shift its position in the same direction and consequently the peak $p_{13}$ in the current segment $d_{13}$ occurs out of synchronism with peak $p_{12}$ in the segment $c'_0$ stored in main memory M and a sharp output appears at $z_2$ in waveform $e$. This causes an output pulse $x_2$ in waveform $f$.

Simultaneously, the current segment $d'_{13}$ is being compared with the prior segment $c'_{12}$ stored in supplemental memory device M' and since the respective peaks $p'_{13}$ and $p'_{12}$ are out of phase, a sharp output appears in waveform $e'$ at $z'_3$ and an output $q_3$ appears in waveform $f$. Thus, an output pulse $r_3$ occurs at $f$ while waveform $q$ goes high at $y_2$. This signals main memory device M to receive a new input during the next scanning period $s_{14}$ and, simultaneously, an output count occurs at O.

Main memory device M reads in the output segment $d_{14}$ as it is produced during the next scanning periods $s_{14}$, as indicated in waveform $c$ in dotted lines, and no change occurs at output $e$. However, since the peak $p'_{13}$ in the preceding output segment $c'_{13}$ is out of synchronism with peak $p'_{14}$ in the current segment $d'_{14}$, a sharp output signal appears in $e'$, as indicated at $z'_4$ an output $q_4$ appears in $f$. and a pulse $r_4$ occurs in waveform $f$.

It is assumed that at the beginning of scanning period $s_{15}$ the curve line has again stabilized and continues in the same position as it held during scanning period $s_{14}$. Therefore, all of the peaks $p_{14}$, $p_{14}$ and $p'_{14}$, $p'_{15}$ are in synchronism during this scanning period and no output appears in any of the other waveforms.

It will be obvious that in lieu of the addition of the supplemental components enclosed within the dash-dot-line in FIG. 1, the main memory device M could be set to read out output segments for scanning periods delayed or staggered with the actually occurring scanning period analog to memory M' above, if desired. Other variations or modifications will no doubt occur to the skilled worker in the art and are considered within the scope of the present invention as set forth in the appended claims.

What is claimed is:

1. A method of reading an optically visible curve line carried on a recording medium and providing an indication of the meandering of the curve line which method comprises the steps of scanning at a fixed cyclical rate transverse segments of said recording medium with a photoelectronic scanning beam while moving the recording medium relative to said beam, to generate a video output signal containing for each scanning period a voltage train varying in accordance with changes in the optical density of the corresponding scanned segment across the medium and which contains at least one pulse produced when the scanning beam $c$ crosses the curve line, additively combining each such voltage train after inversion of its polarity with the voltage train generated during a preceding scanning period to produce an output signal detecting when variations in the two voltage trains being compared deviate out of synchronism or in magnitude, comparing this output signal with a fixed reference signal of a magnitude higher than noise components to produce an output pulse whenever such output signal exceeds the reference signal, driving a binary counter having a digital output in synchronization with the rate of scanning of the record medium and initiating a readout of the instantaneous value carried by such counter upon the occurrence of said output pulse, said value corresponding to the time lapse between the start of a scanning period and the occurrence of said output pulse which corresponds to the location of the curve line segment above a base time.

2. The method of claim 1 wherein a given voltage train is stored in a memory device and repeatedly read out for additive combination with inverted successive subsequent voltage trains until a deviation in their respective variations occurs of sufficient magnitude to produce said output pulse and then replacing said stored train in such memory device with the next voltage train in said other signal for comparison with subsequent trains.

3. The method of claim 1 wherein each voltage train is in said video signal additively combined with the voltage train of the immediately preceding scanning period.

4. The method of claim 1 wherein the voltage train for each scanning period is additively combined (a) with the voltage train of the immediately preceding scanning period and (b) with the voltage train of the prior scanning period immediately following that at which occurred the last significant deviation in the variations of two combined voltage trains, to generate for both such combinations respective output signals indicative of the extents of deviations occurring during such combinations, each of said output signals being compared against a fixed reference signal to produce respective output pulses when their respective values exceed such reference signals, and either or both of such output pulses is used to actuate the binary counter to readout the instantaneous count present therein.

5. The method of claim 2 wherein said output pulse actuating the digital counter controls said memory device to erase the prior stored voltage train and receive and store therein the voltage train produced during the following scanning period.

6. The method of claim 2 wherein each voltage train is sampled at a rate synchronized with the counting rate of the binary counter and the voltage magnitude of each such sample is converted to digital form for delivery to the memory device and the output of the memory device is reconverted into analog form for additive combination with each such successive voltage signal train combined therewith.

7. Apparatus for reading an optically visible curve line carried on a recording medium and providing an indication of the meandering of the curve line which comprises means for scanning at a fixed cyclical rate transverse segments of said recording medium with a photoelectronic scanning beam while moving the recording medium relative to said beam, to generate a video output signal containing for each scanning period a voltage train varying in accordance with changes in the optical density of the corresponding scanned segment across the medium and which contains at least one pulse produced when the scanning beam crosses the curve line, means for additively combining each such voltage train after inversion of its polarity with the voltage train generated during a preceding scanning period to produce an output signal detecting when variations in the two voltage trains being compared deviate out of synchronism or in magnitude, means for comparing this output signal with a fixed reference signal of a magnitude higher than noise components to produce an output pulse whenever such output signal exceeds the reference signal, a binary counter having a digital output, means for driving said counter in synchronization with the rate of scanning of the record medium, and means for initiating a readout of the instantaneous value carried by such counter upon the occurrence of said output pulse, said value corresponding to the time lapse between the start of a scanning period and the occurrence of said output pulse which corresponds to the location of the curve line segment above a base line.

8. The apparatus of claim 7 including a memory device for storing a given voltage train and repeatedly reading out the same for additive combination with inverted successive subsequent voltage trains until a deviation in their respective variations occurs of sufficient magnitude to produce said output pulse and means responsive to said pulse for controlling said memory device to replace the train stored therein with the next voltage train in said video signal for comparison with subsequent trains.

* * * * *